United States Patent
McCluskey

(10) Patent No.: US 10,875,239 B2
(45) Date of Patent: *Dec. 29, 2020

(54) HEAD CUSHION INCLUDING CONSTANT FORCE COMPRESSION LATTICE

(71) Applicant: Carbon, Inc., Redwood City, CA (US)

(72) Inventor: Sean Friedrich Walter McCluskey, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,660

(22) Filed: Aug. 9, 2019

(65) Prior Publication Data
US 2019/0358894 A1 Nov. 28, 2019

Related U.S. Application Data

(63) Continuation of application No. 15/920,779, filed on Mar. 14, 2018, now Pat. No. 10,384,394.
(Continued)

(51) Int. Cl.
*B29C 64/124* (2017.01)
*B29C 64/35* (2017.01)
(Continued)

(52) U.S. Cl.
CPC ........... *B29C 64/124* (2017.08); *B29C 35/02* (2013.01); *B29C 64/35* (2017.08); *B29C 71/02* (2013.01);
(Continued)

(58) Field of Classification Search
CPC ....... B29C 64/124; B29C 71/02; B29C 64/35; B29C 35/02; B29C 71/04; B29C 2071/0045; B29C 64/106; B29C 67/00; B29C 64/20; B33Y 10/00; B33Y 80/00; B33Y 40/00; B33Y 30/00; B33Y 70/00; B65D 81/1075; F16K 27/00; Y10T 428/24025; Y10T 428/24165; Y10T 428/24157; Y10T 428/24149; Y10T 428/26; B28B 1/001; B32B 27/00; B32B 3/12; B32B 5/18; B32B 5/02; B32B 1/00; B32B 2307/726; B32B 2553/02; B32B 2607/00; B32B 2571/00; B32B 2419/00;
(Continued)

(56) References Cited

U.S. PATENT DOCUMENTS 3,004,934 A 10/1961 Dosmann et al.
4,020,208 A 4/1977 Mercer et al.
(Continued)

*Primary Examiner* — Frank J Vineis
*Assistant Examiner* — Donald M Flores, Jr.
(74) *Attorney, Agent, or Firm* — Myers Bigel, P.A.

(57) ABSTRACT

A first aspect of the present invention is a constant force compression construct, comprising: (a) a plurality of compressible layers, each compressible layer comprising a plurality of interconnected flexible struts configured as a regular hexagonal lattice of repeating unit cells, with the layers spaced apart from one another, and with the unit cells of each layer aligned with one another; and (b) a plurality of beams interconnecting each of the compressible layers with each respective adjacent compressible layer to form a three-dimensional lattice having an upper portion, a lower portion, and a compressible region therebetween, with the repeating unit cells contained in the compressible region.

14 Claims, 8 Drawing Sheets

Related U.S. Application Data

(60) Provisional application No. 62/471,631, filed on Mar. 15, 2017.

(51) Int. Cl.

| | | |
|---|---|---|
| *B29C 71/02* | (2006.01) | |
| *B33Y 10/00* | (2015.01) | |
| *B33Y 40/00* | (2020.01) | |
| *B33Y 80/00* | (2015.01) | |
| *B65D 81/107* | (2006.01) | |
| *F16K 27/00* | (2006.01) | |
| *B29C 35/02* | (2006.01) | |
| B29L 31/58 | (2006.01) | |
| B29K 75/00 | (2006.01) | |
| B29L 31/30 | (2006.01) | |
| B29L 31/00 | (2006.01) | |
| B33Y 70/00 | (2020.01) | |
| E04B 1/35 | (2006.01) | |
| B33Y 30/00 | (2015.01) | |
| E04C 5/07 | (2006.01) | |
| B32B 27/00 | (2006.01) | |
| B32B 3/12 | (2006.01) | |
| B32B 5/18 | (2006.01) | |
| B32B 5/02 | (2006.01) | |
| B32B 1/00 | (2006.01) | |
| B29C 64/106 | (2017.01) | |
| B29C 67/00 | (2017.01) | |
| B29C 64/20 | (2017.01) | |
| B28B 1/00 | (2006.01) | |
| B29C 71/04 | (2006.01) | |
| B29C 71/00 | (2006.01) | |

(52) U.S. Cl.
CPC ............... *B33Y 10/00* (2014.12); *B33Y 40/00* (2014.12); *B33Y 80/00* (2014.12); *B65D 81/1075* (2013.01); *F16K 27/00* (2013.01); B28B 1/001 (2013.01); B29C 64/106 (2017.08); B29C 64/20 (2017.08); B29C 67/00 (2013.01); B29C 71/04 (2013.01); B29C 2071/0045 (2013.01); B29K 2075/00 (2013.01); B29L 2031/3076 (2013.01); B29L 2031/58 (2013.01); B29L 2031/712 (2013.01); B29L 2031/7506 (2013.01); B32B 1/00 (2013.01); B32B 3/12 (2013.01); B32B 5/02 (2013.01); B32B 5/18 (2013.01); B32B 27/00 (2013.01); B32B 2307/726 (2013.01); B32B 2419/00 (2013.01); B32B 2553/00 (2013.01); B32B 2553/02 (2013.01); B32B 2571/00 (2013.01); B32B 2607/00 (2013.01); B33Y 30/00 (2014.12); B33Y 70/00 (2014.12); E04B 1/3505 (2013.01); E04C 5/07 (2013.01); Y10T 428/24025 (2015.01); Y10T 428/24149 (2015.01); Y10T 428/24157 (2015.01); Y10T 428/24165 (2015.01); Y10T 428/26 (2015.01)

(58) Field of Classification Search
CPC ..... B32B 2553/00; E04B 1/3505; E04C 5/07; B29L 2031/58; B29L 2031/3076; B29L 2031/712; B29L 2031/7506; B29K 2075/00

See application file for complete search history.

(56) References Cited

U.S. PATENT DOCUMENTS

| | | | |
|---|---|---|---|
| 5,039,567 A | 8/1991 | Landi et al. | |
| 5,879,780 A | 3/1999 | Kindinger et al. | |
| 6,026,527 A | 2/2000 | Pearce | |
| 6,865,759 B2 | 3/2005 | Pearce | |
| 7,060,213 B2 | 6/2006 | Pearce | |
| 7,424,967 B2 * | 9/2008 | Ervin | A47J 36/02 428/116 |
| 7,678,440 B1 | 3/2010 | McKnight et al. | |
| 8,434,748 B1 | 5/2013 | Pearce et al. | |
| 8,628,067 B2 | 1/2014 | Pearce et al. | |
| 8,784,982 B2 | 7/2014 | Pearce et al. | |
| 8,919,750 B2 | 12/2014 | Pearce et al. | |
| 8,932,692 B2 | 1/2015 | Pearce | |
| 9,051,169 B2 | 6/2015 | Pearce et al. | |
| 9,116,428 B1 | 8/2015 | Jacobsen et al. | |
| 9,205,601 B2 | 12/2015 | Desimone et al. | |
| 9,598,606 B2 | 3/2017 | Rolland et al. | |
| 9,603,461 B2 | 3/2017 | Pearce et al. | |
| 9,676,963 B2 | 6/2017 | Rolland et al. | |
| 9,921,037 B2 | 3/2018 | Wadley et al. | |
| 2006/0080835 A1 | 4/2006 | Kooistra et al. | |
| 2011/0283873 A1 | 11/2011 | Wadley et al. | |
| 2013/0052396 A1 | 2/2013 | Dean et al. | |
| 2013/0143060 A1 | 6/2013 | Jacobsen et al. | |
| 2016/0361889 A1 | 12/2016 | Bartolome | |
| 2018/0095448 A1 | 4/2018 | Vernon | |

* cited by examiner

HEAD CUSHION INCLUDING CONSTANT FORCE COMPRESSION LATTICE

RELATED APPLICATIONS

This application is a continuation of U.S. patent application Ser. No. 16/920,779 filed Mar. 14, 2018, which claims priority to U.S. Provisional Application No. 62/471,631, filed Mar. 15, 2017, the disclosures of which are hereby incorporated by reference in their entireties.

FIELD OF THE INVENTION

The present invention relates to compression materials, and particularly concerns constant force compression materials.

FIELD OF THE INVENTION

Hooke's law is a principle of physics that states that the force need to compress or extend a body of material by some distance is proportional to that distance. Known since stated by English physicist Robert Hooke in the late 1600s, most materials obey Hooke's law, at least within some limits.

Materials that deviate substantially from Hooke's law, sometimes called "non-Hookean" materials have a variety of uses. For compressive materials, non-Hookean materials (that is, materials that have an extended "plateau" in their stress-strain curve), the uses include impact absorbing materials in the automotive industry, such as automobile bumpers, side panels and the like. Unfortunately, such materials, including rigid polyurethane foams, often obtain their effect by gradually collapsing, and hence do not return to their previous or original shape. See, e.g., Goga Vladimir, *Measurement of the Energy Ansorption Capability of Polyurethane Foam*, POSTERUS.sk (Aug. 3, 2010). Accordingly, there is a need for new, constant force, compression materials that can restore after compression to their original configuration.

SUMMARY

A first aspect of the present invention is a constant force compression construct, comprising: (a) a plurality of compressible layers, each compressible layer comprising a plurality of interconnected flexible struts configured as a regular hexagonal lattice of repeating unit cells, with the layers spaced apart from one another, and with the unit cells of each layer aligned with one another; and (b) a plurality of beams interconnecting each of the compressible layers with each respective adjacent compressible layer to form a three-dimensional lattice having an upper portion, a lower portion, and a compressible region therebetween, with the repeating unit cells contained in the compressible region.

In some embodiments, the compressible region is anisotropically compressible in plane with said compressible layers and along the longest dimension of the hexagonal structures upon constant (e.g., plus or minus five or ten percent) application of pressure, and which compressible region rebounds to its prior pre-compressed dimension upon removal of the pressure.

In some embodiments, the compressible region has a compression ratio (of precompressed height to compressed height) of at least 2:1 or 3:1, to 8:1 or 10:1, or more.

In some embodiments, the compressible layers have a unit cell size of 10 or 20 microns (or less) up to 10 or 20 millimeters (or more).

In some embodiments, the compressible layers have a height (Z dimension) of 10 or 20 unit cells (or less), up to $10^6$ or $10^{12}$ unit cells (or more).

In some embodiments, the struts and beams (and optionally said first and/or second force-dispersing elements) are integrally formed with one another.

In some embodiments, the struts and beams (and optionally said first and/or second force-dispersing elements) are comprised of an elastomeric material.

In some embodiments, the struts and beams (and optionally said first and/or second force-dispersing elements) are comprised of polyurethane.

In some embodiments, the compressible layers are flat, curved or a combination thereof.

In some embodiments, the beams are parallel to one another, radially arranged with respect to one another, or a combination thereof.

In some embodiments, the construct is produced by the process of additive manufacturing (e.g., by stereolithography, such as by continuous liquid interface production).

A method of making a construct as described herein can be carried out by: (a) forming an intermediate object by additive manufacturing (preferably by stereolithography, and most preferably by continuous liquid interface production) with a dual cure polymerizable liquid, the intermediate object having the same shape as, or a shape to be imparted to, the construct; then (b) optionally washing the intermediate object; and then (c) further curing the intermediate object, optionally but preferably by heating, to produce the construct.

In some embodiments, a head cushion is provided comprising a construct of any of the above constructs (e.g., a helmet pad, a head rest, an audio headset cushion, a video headset cushion (e.g., for a three-dimensional or virtual reality display), a combination audio and video headset cushion, etc.).

In some embodiments, an automotive, aerospace, or architectural bumper, impact panel, or interior cushion is providing comprising a construct of any of the above constructs.

In some embodiments, a container is provided comprising an outer casing, and at least one construct of any of the above constructs within said casing. The outer casing and the at least one construct together are configured to contain at least one object therein.

In some embodiments, a stepwise response device comprising at least two constructs of any of the above constructs that are stacked upon one another (and optionally integrally formed with one another), with their dimensions of constant force compression aligned, and with each of said constructs having a different compression profile.

In some embodiments, a controllable response device, includes (a) a fluid impermeable outer shell defining an inner cavity; (b) at least one construct of any preceding claim contained in said cavity; and (c) a fluid valve (e.g., a metering valve, a drain and fill valve, etc.) in said outer shell configured to fill said cavity with fluid and/or drain fluid from said cavity.

Dosman and Steel, U.S. Pat. No. 3,004,934, describe flexible shock-absorbing polyurethane foams, but materials such as these are generally not constant force compression materials.

The foregoing and other objects and aspects of the present invention are explained in greater detail in the drawings herein and the specification set forth below. The disclosures of all United States patent references cited herein are to be incorporated herein by reference.

DETAILED DESCRIPTION

Figure 1:
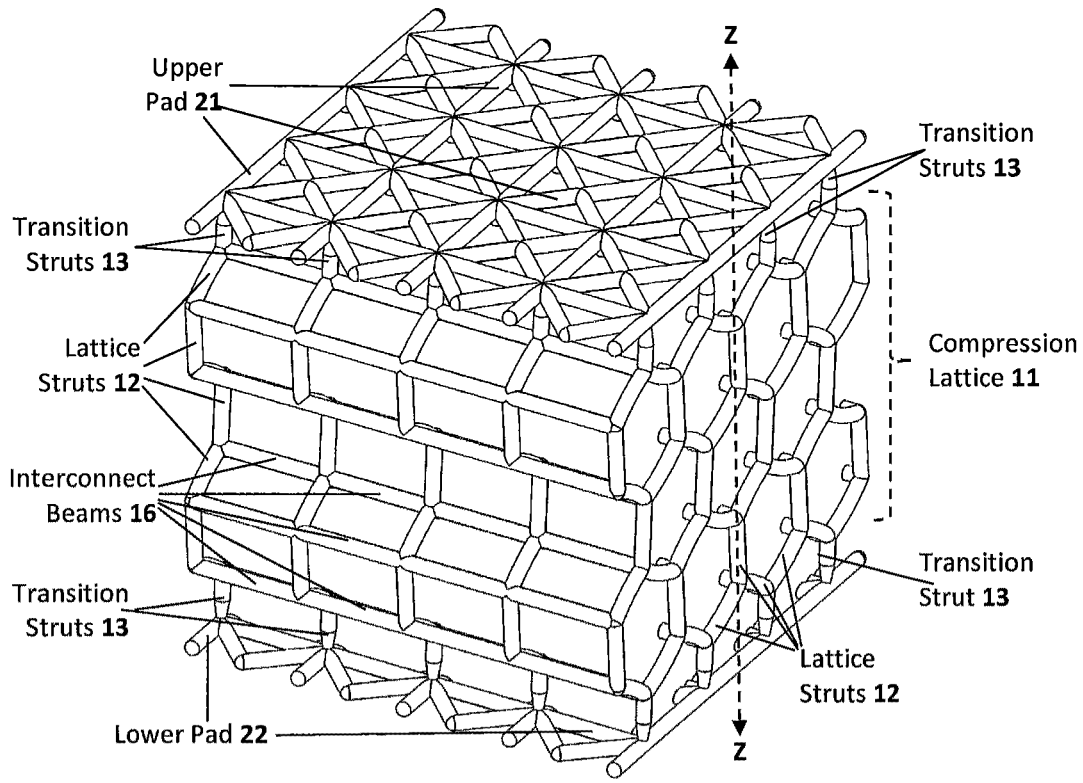
FIG. 1 is a perspective view of a constant force compression objects of the present invention, with internal portions of the object omitted for clarity.
Figure 2:
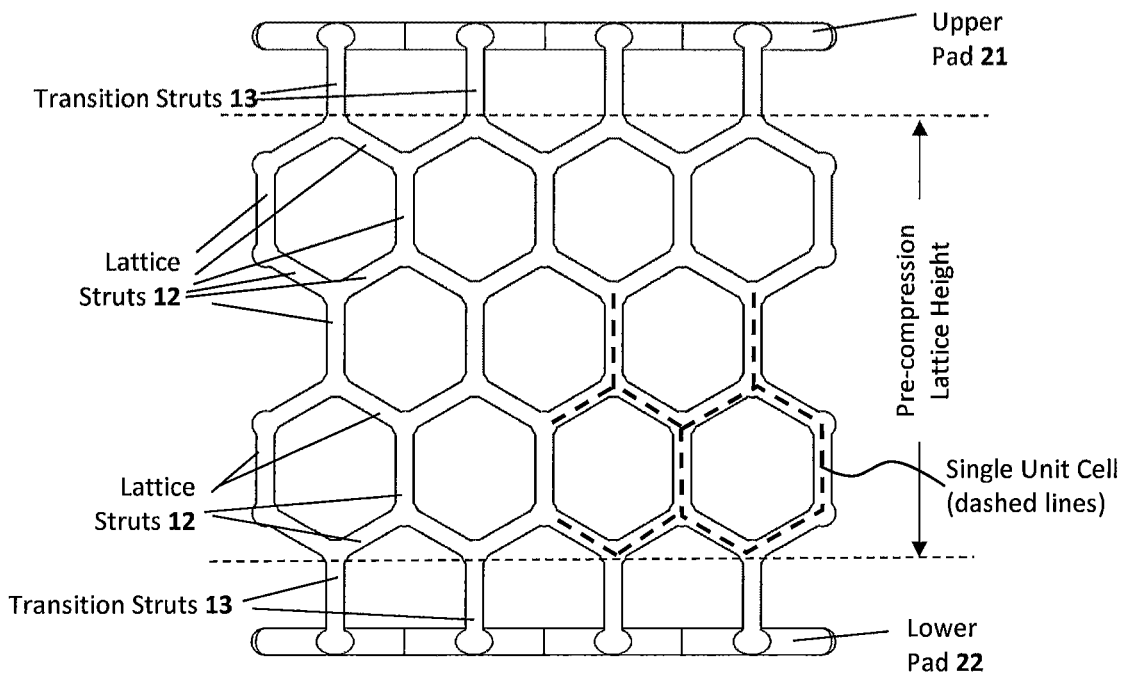
FIG. 2 is a first side view of the lattice of FIG. 1.
Figure 3:
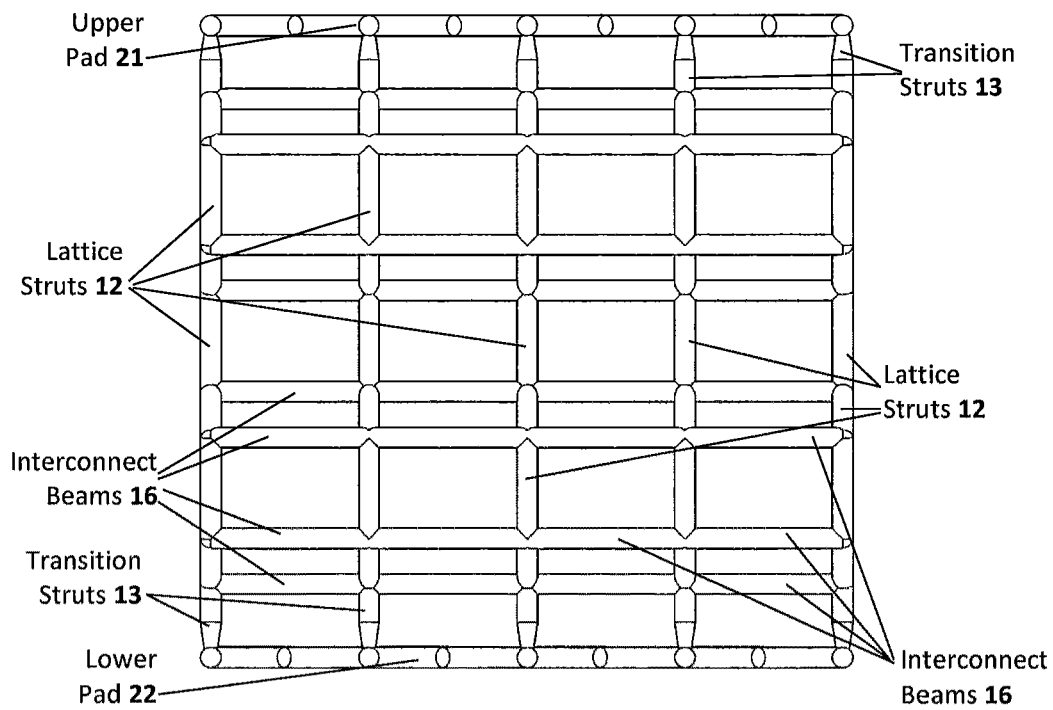
FIG. 3 is a second side view of the lattice of FIG. 1.
Figure 4:
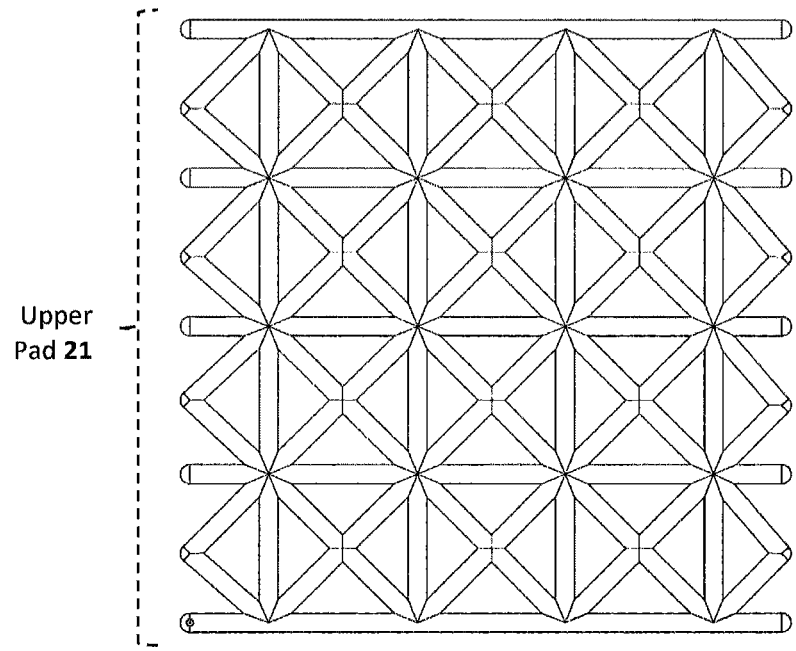
FIG. 4 is a top view of the lattice of FIG. 1.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

1. Methods of Making.

Objects as described herein can be produced by any suitable process, but are preferably produced by additive manufacturing, particularly by stereolithography, and most preferably by continuous liquid interface production (CLIP).

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. The disclosures of these patents and applications are incorporated by reference herein in their entirety.

CLIP is known and described in, for example, PCT Applications Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the intermediate three-dimensional object is formed, it is optionally washed, optionally dried (e.g., air dried) and/or rinsed (in any sequence). It is then further cured, preferably by heating.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the intermediate at ambient temperature for a sufficient time to effect further cure—may in some embodiments also be employed.

2. Materials.

Any suitable material can be used to carry out the invention. Preferably, the material is one which produces an elastomeric product. In some embodiments, the objects are comprised of a polyurethane material (including polyuria materials). In some embodiments, the objects are produced from a dual cure stereolithography resin.

Dual cure stereolithography resins suitable for stereolithography techniques (particularly for CLIP) are described in J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/016077), and PCT/US2015/036946 (see also U.S. Pat. No. 9,453, 142). These resins usually include a first polymerizable system typically polymerized by light (sometimes referred to as "Part A") from which an intermediate object is produced, and also include at least a second polymerizable system ("Part B") which is usually cured after the intermediate object is first formed, and which impart desirable structural and/or tensile properties to the final object.

3. Products.

As noted above, disclosed herein is a constant force compression construct. The construct includes (a) a plurality of compressible layers (e.g., compressible in an edge-wise direction), each compressible layer comprising a plurality of interconnected flexible struts configured as a regular hexagonal lattice of repeating unit cells, with the layers spaced apart from one another, and with the unit cells of each layer aligned with one another; and (b) a plurality of beams interconnecting each of the compressible layers with each respective adjacent compressible layer to form a three-dimensional lattice having an upper portion, a lower portion, and a compressible region therebetween, with the repeating unit cells contained in the compressible region. Optionally, but in some embodiments preferably, the construct further includes (c) a first force-dispersing segment (or "pad") connected to the upper portion. Optionally, but in some embodiments preferably, the construct further includes (d) a second force-dispersing segment (or "pad") connected to the lower portion. An example of one embodiment is shown in FIGS. 1-4.

Figure 5:
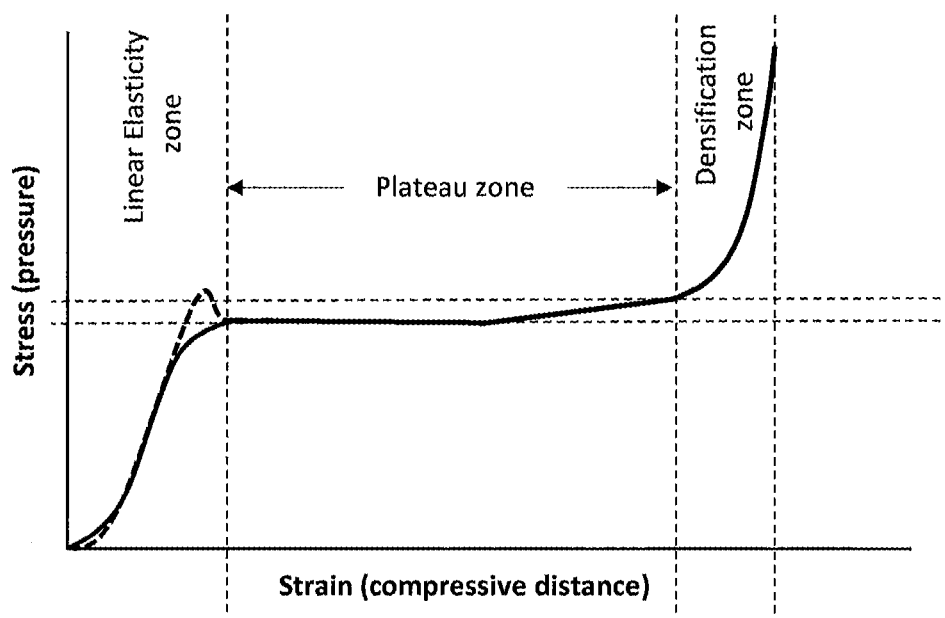
FIG. 5 is a pair of partially overlapping, representative, stress-strain curves for an object of FIGS. 1-4.
Figure 6:
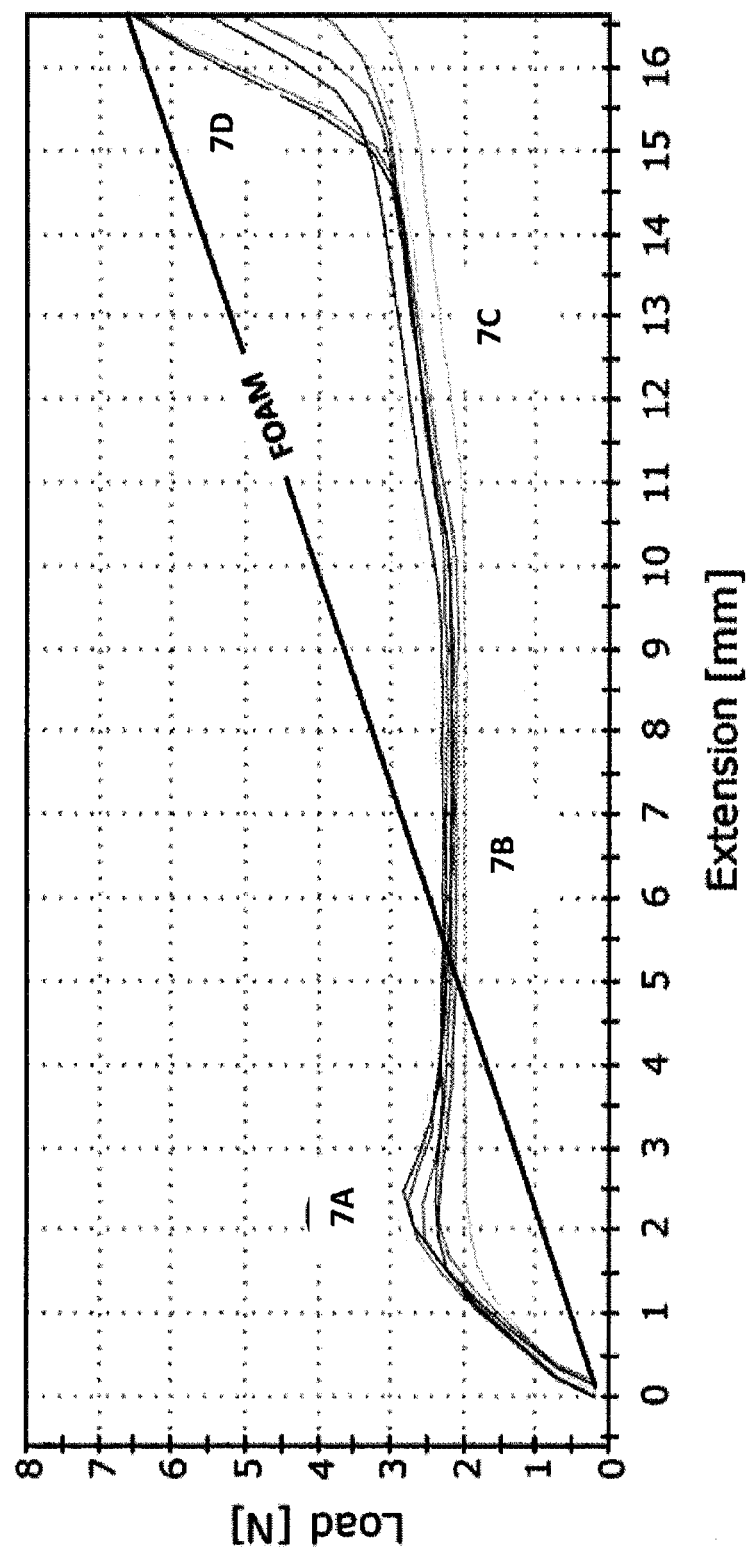
FIG. 6 shows a set of actual stress strain curves for actual objects formed from elastomeric polyurethane by continuous liquid interface production, the objects having a configuration substantially like that of FIGS. 1-4.
Figure 7A:
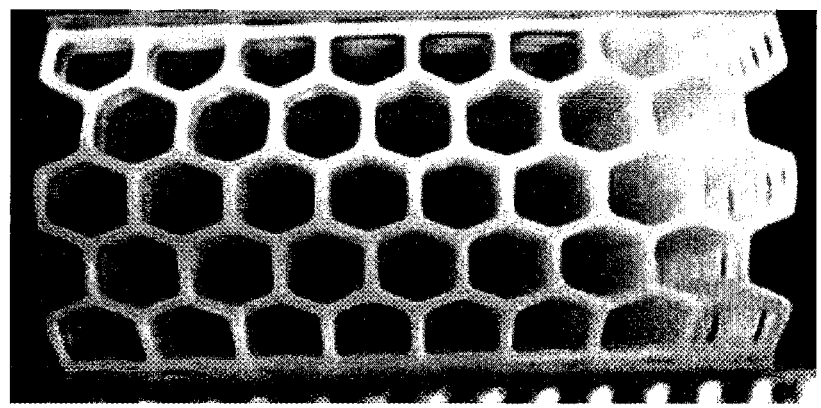
FIG. 7A shows an object during stress strain testing at point 7A in FIG. 6.
Figure 7B:
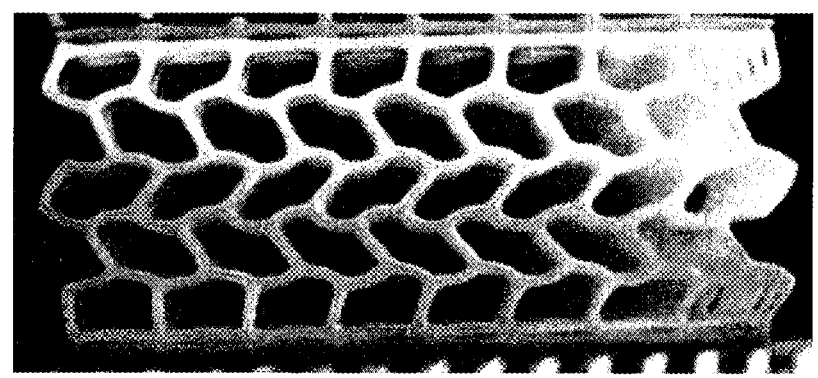
FIG. 7B shows an object during stress strain testing at point 7B in FIG. 6.
Figure 7C:
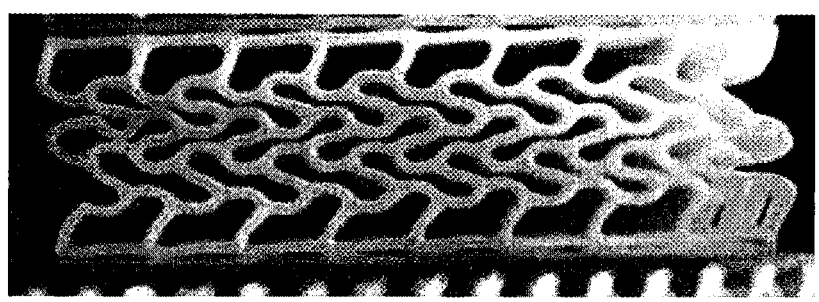
FIG. 7C shows an object during stress strain testing at point 7C in FIG. 6.
Figure 7D:
FIG. 7D shows an object during stress strain testing at point 7D in FIG. 6.

In some embodiments of the foregoing, the compressible region (or "compressible lattice") is anisotropically compressible in plane with the compressible layers and along the longest dimension of the hexagonal structures upon substantially constant (e.g., plus or minus five or ten percent) application of pressure (within the "plateau zone," which does not including linear elasticity zones or densification zones typical in compressive stress-strain curves), and which compressible region rebounds to its prior pre-compressed dimension upon removal of the pressure (assuming not compressed to failure, in terminal regions of the densification zone). A representative example is shown in FIG. 5, and an actual example is shown in FIG. 6, with photographs of an actual construct during various points of stress-strain (as marked in FIG. 6) testing shown in FIGS. 7A-7D.

Figure 8:
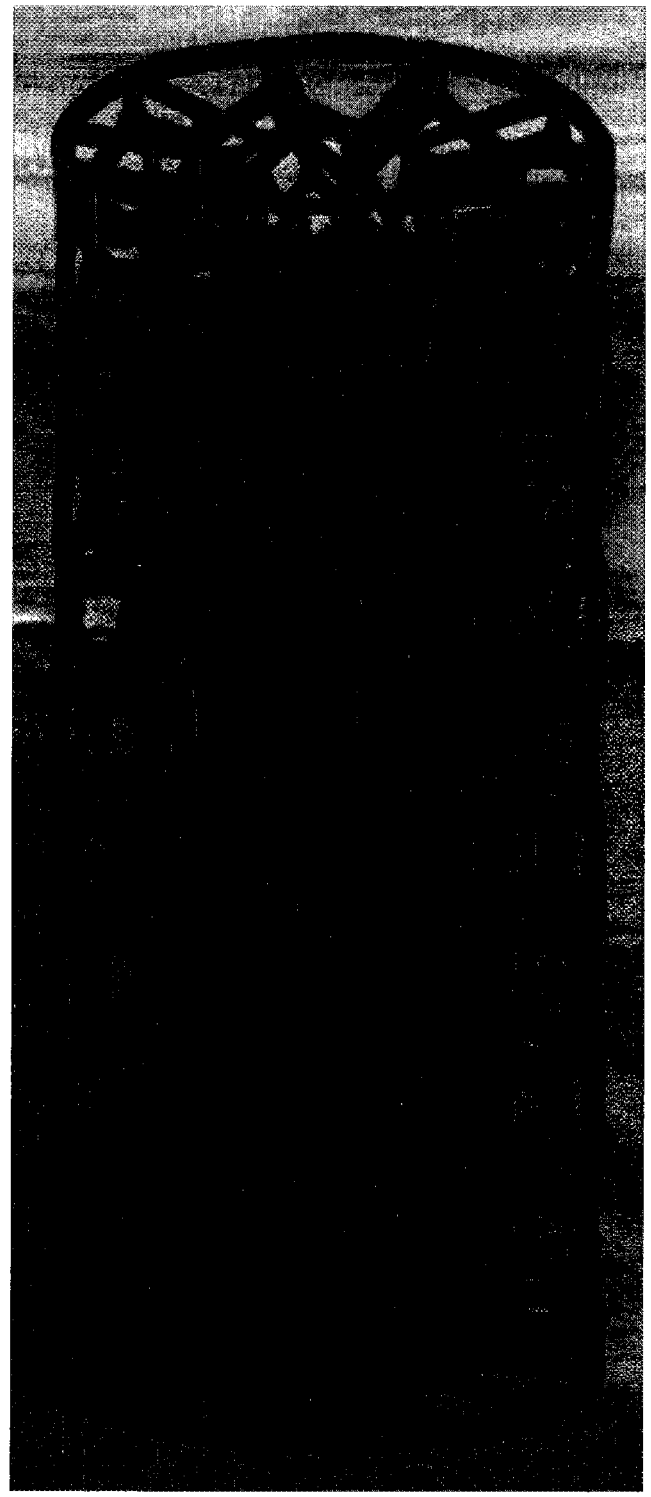
FIG. 8 is a side view of an alternate embodiment of the invention, where the compression layers are cylindrically arranged.
Figure 9:
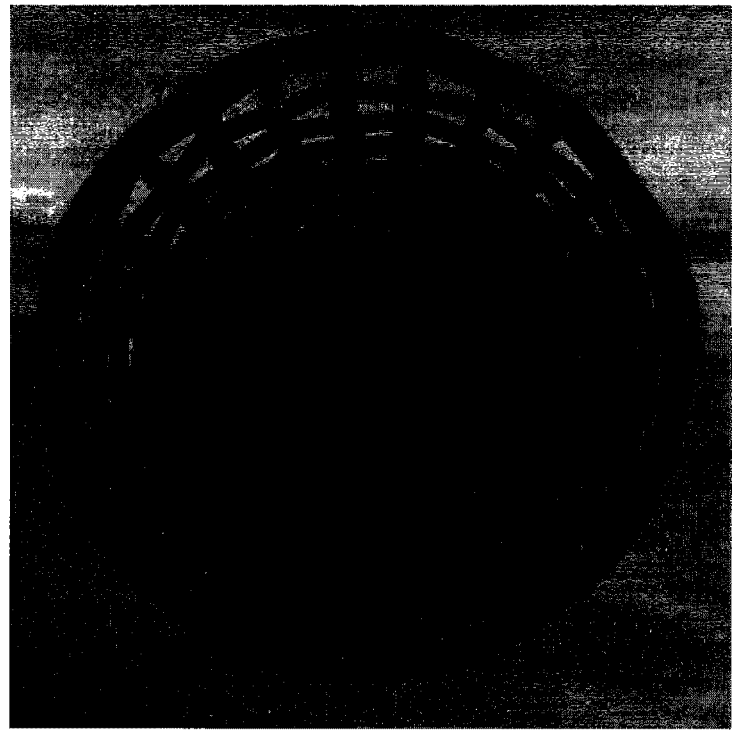
FIG. 9 is a top view of the embodiment of FIG. 8.

In some embodiments, the compressible layers are flat (as shown in FIGS. 1-4), curved (as shown in FIGS. 8-9), or a combination thereof.

In some embodiments, the beams are parallel to one another (as shown in FIGS. 1-4), radially arranged with respect to one another (as shown in FIGS. 8-9), or a combination thereof.

In some embodiments of the foregoing, the compressible region (or "compressible lattice") has a compression ratio (of precompressed height to compressed height) of at least 2:1 or 3:1, to 8:1 or 10:1, or more.

In some embodiments of the foregoing, the compressible layers have a unit cell size of 10 or 20 microns (or less) up to 10 or 20 millimeters (or more). In some embodiments of the foregoing, wherein the compressible layers have a height (that is, in the Z dimension) of 10 or 20 unit cells (or less), up to $10^6$ or $10^{12}$ unit cells (or more).

In some embodiments, the struts and beams (and optionally, but preferably, the first and/or second force-dispersing elements) are integrally formed with one another.

In some embodiments, the struts and beams (and optionally, but preferably, the first and/or second force-dispersing elements) are comprised of an elastomeric material.

In some embodiments, the struts and beams (and optionally, but in some embodiments preferably, the first and/or second force-dispersing elements) are comprised of polyurethane.

4. Uses and Applications.

Constructs as described above may be used for any of a variety of purposes, including but not limited to wearables and bionic measurement systems; medical devices including but not limited to casts, braces, bandages, restraints; weight distribution devices including belts, straps, backpacks, rucksacks; sporting goods such as ball bladders; building supports in earthquake resistant architecture; containers for electronic devices; aerospace and automotive paneling; locking and escapement mechanisms; precision tools and scientific measurement tools including binary force sensors, switches, etc.; flooring; safety switches (mechanical fuse); fluid filled responses materials (fill or drain lattice with fluid to control response); etc.

For example, head cushions for a helmet pad, a head rest, an audio headset cushion, a video headset cushion (e.g., for a three-dimensional or virtual reality display), a combination audio and video headset cushion, or the like, can be formed from constructs of the present invention, to provide a more constant force to the head of the wearer. The constructs can be wrapped with a suitable body-contact cover, which may be separately made, formed during the additive manufacturing process of the construct, or a combination thereof.

Similarly, an automotive, aerospace, or architectural bumper, impact panel, or interior cushion can be produced that includes constructs as described herein, configured as appropriate for their intended use. Again, an outer cover can be separately fabricated and joined to the construct, fabricated by additive manufacturing with the construct, or a combination thereof.

Likewise, a storage or shipping container or the like can be made from an outer casing (e.g., a clam-shell casing or the like), and at least one construct as described herein. The casing and the construct can be together configured to contain at least one object therein (e.g., for the general purpose storage of objects of different shape, or for the specific storage of a specific object with a shape to which the case and construct are configured to match).

A stepwise response device comprising at least two constructs (or three, four, or five or more) of any preceding claim stacked upon one another (and optionally integrally formed with one another, e.g., as a single additively manufactured construct), with their dimensions of constant force compression aligned, and with each of the constructs having a different compression profile. One non-limiting example thereof is shown in FIGS. 10-11 (where the housing and valve are optional).

Figure 10:
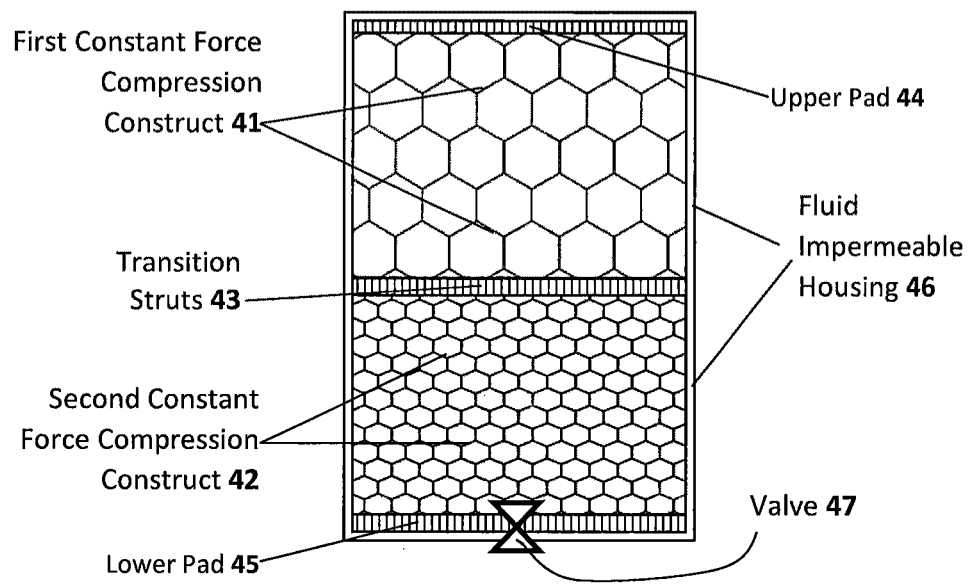
FIG. 10 is a side view of a pair of stacked objects of FIGS. 1-4, within a fluid impermeable housing.
Figure 11:
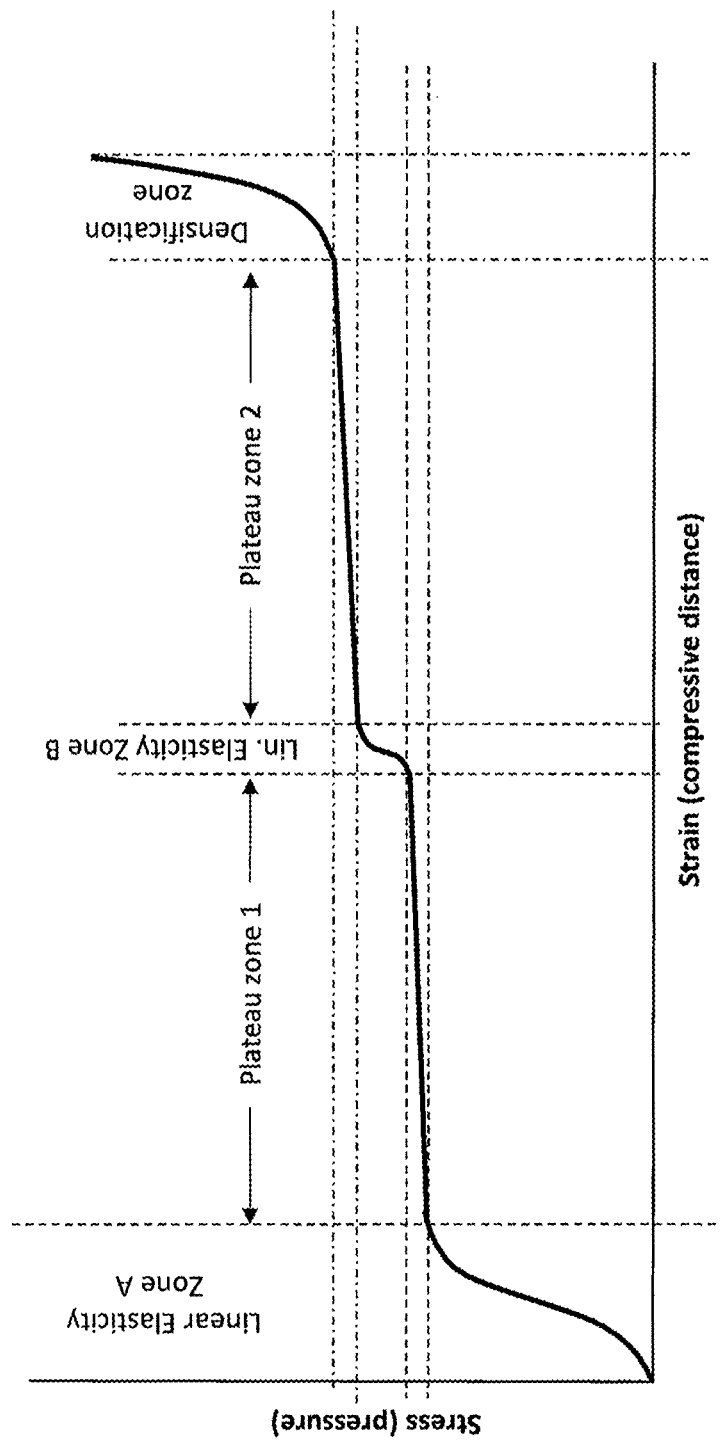
FIG. 11 is an example stress-strain curve for a pair of stacked objects of FIG. 6, where each object has a different compressive profile (e.g., one has a higher "plateau" than the other).

As also illustrated by FIG. 10, constructs of the invention can be fabricated into response-controllable devices by providing: (a) a fluid impermeable outer shell defining an inner cavity; (b) at least one construct as described above (and optionally a second, or more, as shown in FIG. 10) contained in the cavity; and (c) optionally, but preferably, a fluid valve (e.g., a metering valve, a drain and fill valve, etc.) in the outer shell configured to fill the cavity with fluid and/or drain fluid from the cavity. The fluid can be gas (e.g., air, nitrogen etc.), or liquid (e.g., water, saline solution, oil, etc.). The construct can be supplied filled with the fluid, or empty. If supplied filled with the fluid, the construct can optionally be in "single use" form, without a valve, and with the fluid removed by simply puncturing the housing (in which case, the fluid dampening effect will be lost, but the construct can continue to compress and return as described above).

The foregoing is illustrative of the present invention, and is not to be construed as limiting thereof. The invention is defined by the following claims, with equivalents of the claims to be included therein.

I claim:

1. A head cushion comprising a constant force compression construct, the constant force compression construct comprising:
   (a) a plurality of compressible layers, each compressible layer comprising a plurality of interconnected flexible struts configured as a regular hexagonal lattice of repeating unit cells, with said layers spaced apart from one another, and with said unit cells of each layer aligned with one another;
   (b) a plurality of beams interconnecting each of said compressible layers with each respective adjacent compressible layer to form a three-dimensional lattice having an upper portion, a lower portion, and a compressible region therebetween, with said repeating unit cells contained in said compressible region;
   (c) optionally, a first force-dispersing segment connected to said upper portion; and
   (d) optionally, a second force-dispersing segment connected to said lower portion, wherein said compressible layers are curved or a combination of flat and curved.

2. The head cushion of claim 1, wherein said compressible region is anisotropically compressible in plane with said compressible layers and along the longest dimension of the hexagonal structures upon constant application of pressure, and which compressible region rebounds to its prior precompressed dimension upon removal of said pressure.

3. The head cushion of claim 1, wherein said compressible region has a compression ratio of precompressed height to compressed height of 2:1 to 10:1.

4. The head cushion of claim 1, wherein said compressible layers have a unit cell size of 10 microns to 20 millimeters.

5. The head cushion of claim 1, wherein said compressible layers have a height of 10 unit cells to $10^{12}$ unit cells.

6. The head cushion of claim 1, wherein said struts and beams and optionally said first and/or second force-dispersing elements are integrally formed with one another.

7. The head cushion of claim 1, wherein said struts and beams and optionally said first and/or second force-dispersing elements are comprised of an elastomeric material.

8. The head cushion of claim 1, wherein said struts and beams and optionally said first and/or second force-dispersing elements are comprised of polyurethane.

9. The head cushion of claim 1, wherein said compressible layers are curved.

10. The head cushion of claim 1, wherein said beams are parallel to one another, radially arranged with respect to one another, or a combination thereof.

11. The head cushion of claim 1, wherein said construct is produced by an additive manufacturing process.

12. A method of making a head cushion, comprising:
   (a) forming an intermediate object by additive manufacturing with a dual cure polymerizable liquid, said intermediate object having the same shape as, or a shape to be imparted to, a construct; then
   (b) optionally washing said intermediate object; and then
   (c) further curing said intermediate object, optionally by heating, to produce said construct, said construct comprises:
   a plurality of compressible layers, each compressible layer comprising a plurality of interconnected flexible struts configured as a regular hexagonal lattice of repeating unit cells, with said layers spaced apart from one another, and with said unit cells of each layer aligned with one another;
   a plurality of beams interconnecting each of said compressible layers with each respective adjacent compressible layer to form a three-dimensional lattice having an upper portion, a lower portion, and a compressible region therebetween, with said repeating unit cells contained in said compressible region;
   optionally, a first force-dispersing segment connected to said upper portion; and
   optionally, a second force-dispersing segment connected to said lower portion wherein said compressible layers are curved or a combination of flat and curved.

13. The head cushion of claim 1, wherein said construct comprises at least two constructs stacked upon one another, and optionally integrally formed with one another, their directions of constant force compression aligned, and with each of said constructs having a different compression profile.

14. A controllable response device, comprising:
   (a) a fluid impermeable outer shell defining an inner cavity;
   (b) at least head cushion of claim 1 contained in said cavity; and
   (c) a fluid valve in said outer shell configured to fill said cavity with fluid and/or drain fluid from said cavity.

* * * * *